(12) United States Patent
    Belianski et al.

(10) Patent No.: US 11,138,028 B1
(45) Date of Patent: Oct. 5, 2021

(54) HOT GROWING A CLOUD HOSTED BLOCK DEVICE

(71) Applicant: Google LLC, Mountain View, CA (US)

(72) Inventors: Igor Belianski, Sammamish, WA (US);
    Jay Judkowitz, San Jose, CA (US);
    Andrew Kadatch, Redmond, WA (US)

(73) Assignee: Google LLC, Mountain View, CA (US)

( * ) Notice: Subject to any disclaimer, the term of this patent is extended or adjusted under 35 U.S.C. 154(b) by 43 days.

(21) Appl. No.: 16/804,633

(22) Filed: Feb. 28, 2020

Related U.S. Application Data

(63) Continuation of application No. 15/703,295, filed on Sep. 13, 2017, now Pat. No. 10,606,625.

(60) Provisional application No. 62/395,924, filed on Sep. 16, 2016.

(51) Int. Cl.
    *G06F 12/00*   (2006.01)
    *G06F 9/455*   (2018.01)
    *G06F 3/06*    (2006.01)

(52) U.S. Cl.
    CPC .......... *G06F 9/45545* (2013.01); *G06F 3/067* (2013.01); *G06F 3/0644* (2013.01); *G06F 2009/45579* (2013.01)

(58) Field of Classification Search
    CPC .... G06F 9/45545; G06F 3/0644; G06F 3/067; G06F 2009/45579
    See application file for complete search history.

(56) References Cited

U.S. PATENT DOCUMENTS

| | | | |
|---|---|---|---|
| 8,443,166 B2 | 5/2013 | Czezatke et al. | |
| 8,726,273 B2 | 5/2014 | Le | |
| 9,317,313 B2 | 4/2016 | Srinivasan | |
| 9,921,765 B2* | 3/2018 | Kurtin | G06F 3/0665 |
| 10,268,593 B1 | 4/2019 | Olson et al. | |
| 2012/0144391 A1 | 6/2012 | Ueda | |
| 2015/0254319 A1* | 9/2015 | Modukuri | G06F 11/2069 707/639 |
| 2016/0266844 A1 | 9/2016 | Ogawa | |
| 2017/0371568 A1* | 12/2017 | Aravot | G06F 3/0614 |
| 2019/0012110 A1 | 1/2019 | Okano et al. | |
| 2020/0220792 A1* | 7/2020 | Dippenaar | G06F 3/0604 |

FOREIGN PATENT DOCUMENTS

WO    WO-2010030996 A1 *  3/2010  .......... G06F 3/0664

* cited by examiner

*Primary Examiner* — John A Lane
(74) *Attorney, Agent, or Firm* — Honigman LLP; Brett A. Krueger

(57) ABSTRACT

A method of resizing a block storage volume for a virtual machine includes executing the virtual machine and attaching a virtual storage device to the virtual machine. The virtual storage device exposes the block storage volume on memory hardware to the virtual machine. The block storage volume includes a first storage capacity. The method also includes mounting the block storage volume to the virtual machine and resizing the block storage volume while the virtual machine continues to execute. The block storage volume is resized without attaching an additional virtual storage device to the virtual machine or mounting an additional block storage volume to the virtual machine.

24 Claims, 12 Drawing Sheets

HOT GROWING A CLOUD HOSTED BLOCK DEVICE

CROSS REFERENCE TO RELATED APPLICATIONS

This U.S. patent application is a continuation of, and claims priority under 35 U.S.C. § 120 from, U.S. patent application Ser. No. 15/703,295, filed on Sep. 13, 2017, which claims priority under 35 U.S.C. § 119(e) to U.S. Provisional Application 62/395,924, filed on Sep. 16, 2016. The entire disclosures of these prior applications are considered part of the disclosure of this application and are hereby incorporated by reference in their entireties.

TECHNICAL FIELD

This disclosure relates to a system and method that enables hot grow of a cloud hosted block devices.

BACKGROUND

A distributed system may include many interconnected hardware and software resources. Due to the vast number of resources in a distributed system, some distributed systems are very complex and difficult to understand. In large distributed systems, some resources may affect the operation of other resources. As the size of a distributed system increases, it becomes increasingly difficult to ascertain the effect of a particular resource on other resources in the distributed system.

Distributed systems allow developers of a project to create one or more virtual machine (VM) instances hosted by the distributed system using public and/or private images. When creating a VM instance for a corresponding project, a developer specifies a zone, operating system, and machine type for that VM instance. Each VM instance may include one or more corresponding persistent disks for storing data associated with the VM instance. Persistent disks correspond to durable network storage devices that VM instances can access in the same manner a server or desktop computing device accesses physical discs. Persistent disks may include standard hard disk drives (HDD) and solid state drives (SSD), and the distributed system may distribute data across multiple physical disks associated with any given persistent disk. Generally, developers are required to determine a size/capacity of the persistent disk at the time of creation of the corresponding VM instance, thereby placing a burden on developers to make an accurate initial prediction of storage capacity needed for the instance.

SUMMARY

One aspect of the disclosure provides a method of resizing a block storage volume for a virtual machine. The method includes executing, by data processing hardware, the virtual machine and attaching, by the data processing hardware, a virtual storage device to the virtual machine. The virtual storage device exposes a block storage volume on memory hardware to the virtual machine. The block storage volume includes a first storage capacity. The method also includes mounting, by the data processing hardware, the block storage volume to the virtual machine, and resizing, by the data processing hardware, the block storage volume while the virtual machine continues to execute. The block storage volume resizes without attaching an additional block storage device to the virtual machine or mounting an additional block storage volume to the virtual machine.

Implementations of the disclosure may include one or more of the following optional features. In some implementations, resizing the block storage volume includes increasing the block storage volume from the first storage capacity to a second storage capacity greater than the first storage capacity. The virtual storage device attached to the virtual machine may include a root persistent disk that contains an operating system that executes on the virtual machine. In some examples, after mounting the block storage volume to the virtual machine, the method also includes attaching, by the data processing hardware, one or more secondary virtual storage devices to the virtual machine, and mounting, by the data processing hardware, each secondary block storage volume to the virtual machine. Each secondary virtual storage device exposes a corresponding secondary block storage volume on the memory hardware to the virtual machine. Attaching the virtual storage device to the virtual machine may include establishing a logical connection between the virtual storage device and a virtual machine monitor hosting the virtual machine.

In some examples, the method also includes receiving, at the data processing hardware, an identification of the virtual storage device as being a new resource available to the virtual machine, and using, by the data processing hardware, the identification of the virtual storage device for attaching the virtual storage device to the virtual machine and mounting the corresponding block storage volume to the virtual machine. For instance, receiving the identification of the virtual machine may be through a graphical user interface displayed on a screen of a user device (e.g., user computer) in communication with the data processing hardware.

In some implementations, the method also includes configuring, by the data processing hardware, user access of the block storage volume through the virtual machine. Additionally or alternatively, the method may also include resizing, by the data processing hardware, a file system associated with the block storage volume to allow an operating system to access the block storage volume. In some scenarios, the method includes automatically resizing, by the data processing hardware, the file system in response to resizing the block storage volume. The method may also include removing, by the data processing hardware, the block storage volume from the virtual machine while continuing execution of the virtual machine. Here, removing the block storage volume may include unmounting the block storage volume from the virtual machine, and detaching the virtual storage device from the virtual machine.

Another aspect of the disclosure provides a system for resizing a block storage volume for a virtual machine. The system includes data processing hardware and memory hardware in communication with the data processing hardware. The memory hardware stores instructions that when executed on the data processing hardware cause the data processing hardware to perform operations that include executing a virtual machine and attaching a block storage device to the virtual machine. The virtual storage device exposes a block storage volume on the memory hardware to the virtual machine. The block storage volume includes a first storage capacity. The operations further include mounting the block storage volume to the virtual machine and resizing the block storage volume while the virtual machine continues to execute. The block storage volume resizes without attaching an additional block storage device to the virtual machine or mounting an additional block storage volume to the virtual machine.

Implementations of the disclosure may include one or more of the following optional features. In some implementations, resizing the block storage volume includes increasing the block storage volume from the first storage capacity to a second storage capacity greater than the first storage capacity. The virtual storage device attached to the virtual machine may include a root persistent disk that contains an operating system that executes on the virtual machine. In some examples, after mounting the block storage volume to the virtual machine, the operations further include attaching one or more secondary virtual storage devices to the virtual machine, each secondary block storage volume exposing a corresponding secondary block storage volume on the memory hardware to the virtual machine, and mounting each secondary block storage volume to the virtual machine. Attaching the virtual storage device to the virtual machine may include establishing a logical connection between the virtual storage device and a virtual machine monitor hosting the virtual machine.

In some examples, the operations further include receiving an identification of the virtual storage device as being a new resource available to the virtual machine and using the identification of the virtual storage device for attaching the virtual storage device to the virtual machine and mounting the corresponding block storage volume to the virtual machine. In these examples, the operations may further include receiving the identification of the virtual storage device through a graphical user interface displayed on a screen of a user device in communication with the data processing hardware.

In some implementations, the operations further include configuring user access of the block storage volume through the virtual machine. Additionally or alternatively, the operations may further include resizing a file system associated with the block storage volume to allow an operating system to access the block storage volume. In some scenarios, the operations further include automatically resizing the file system in response to resizing the block storage volume. The operations may further include removing the block storage volume from the virtual machine while continuing execution of the virtual machine. Here, removing the block storage volume may include unmounting the block storage volume from the virtual machine, and detaching the virtual storage device from the virtual machine.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Distributed systems include persistent disks (PDs) that are durable storage devices that function similarly to the physical disks in a desktop or a server. The distributed system manages the hardware behind these devices to endure data redundancy and optimize performance for the users. A user of a distributed system, such as a customer developing a project on the distributed system, may execute one or more virtual machines (VM) instances to create a virtual environment that typically emulates a physical computing environment, which may involve specialized hardware, software, or a combination thereof. VMs advantageously offer quick boot times and PD storage. To alleviate the user from the burden of having to accurately estimate PD storage requirements at the time of creation of a corresponding VM instance, implementations herein are directed toward providing the user with a default PD storage capacity, and thereafter allowing the user to resize (e.g., increase) the PD storage capacity to meet new storage requirements as needed. Moreover, the user may resize the PD storage capacity of a corresponding VM instance while the VM instance continues to execute on the distributed system, thereby enabling resizing without having to pause the VM instance and disrupting service. The user may resize the PD storage while the PD storage is attached to the corresponding VM or may resize the PD storage when the corresponding VM and the PD storage are detached from one another. Moreover, data within PD storage may be saved even when the corresponding VM instance is deleted.

Figure 1:
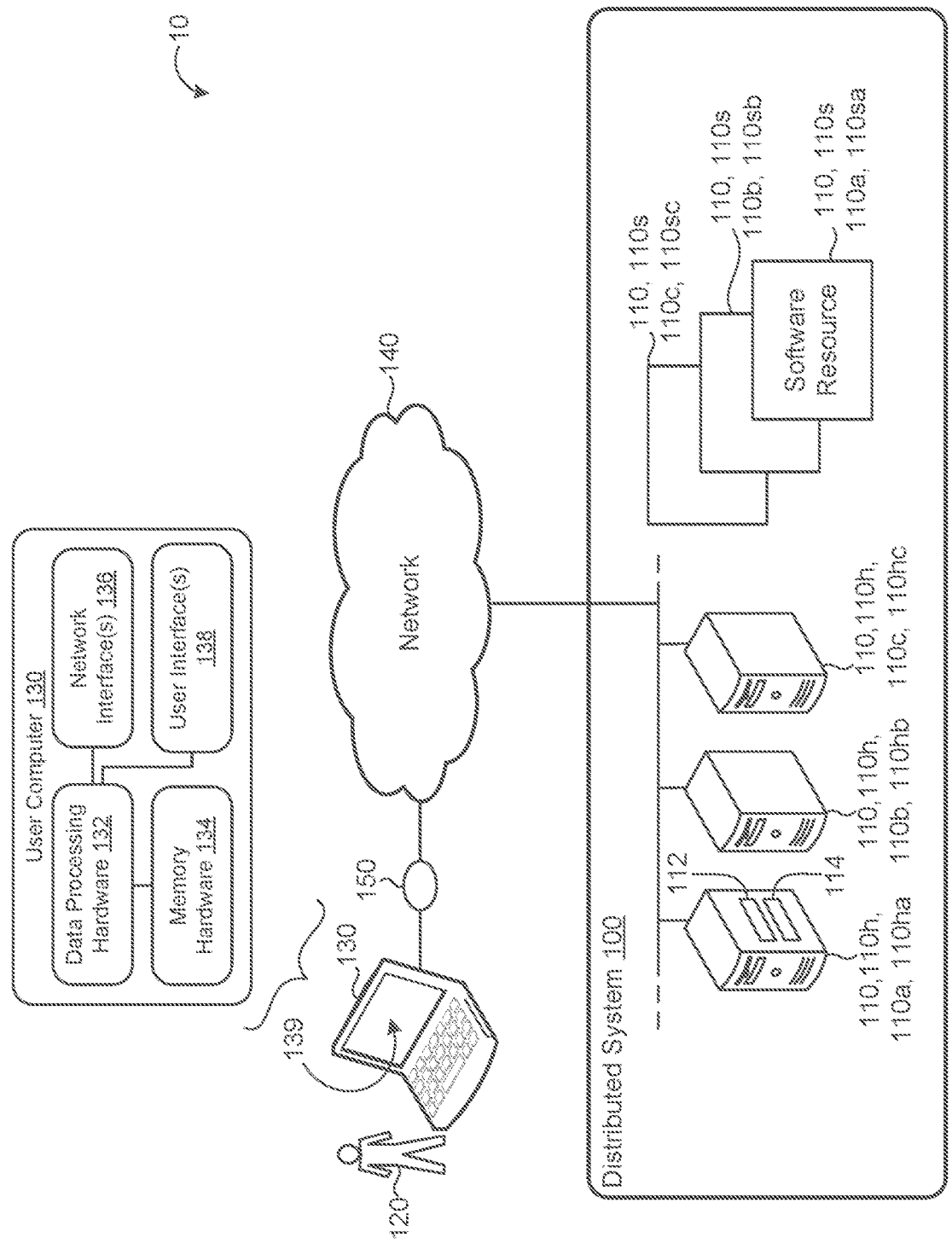
FIG. 1 is a schematic view of an example distributed system having scalable resources.

FIG. 1 illustrates an example system 10 that includes a distributed system 100 configured to add and/or resize PDs at resources 110 of the distributed system. A user computer 130 associated with a user 120 may access the distributed system 100 over a network 140. In the example shown, the user computer 130 includes data processing hardware 132 in communication with memory hardware 134, a network interface device 136, and a user interface 138. The memory hardware 134 (e.g., random access memory (RAM), read-only memory (ROM), hard disk drive (HDD), solid state drive (SDD), and/or flash memory) stores instructions that when executed on the data processing hardware 132 cause the data processing hardware 132 to perform one or more operations. The memory hardware 134 may store computer readable instructions that make up a native application, a web browser, and/or an operating system (OS). The OS acts as an interface between the data processing hardware 132 and the executed applications. The network interface device 136 includes one or more devices configured to communicate with the network 140. The user interface 138 includes one or more devices configured to receive input from and/or provide output to the user 120. The user interface 138 can include, but is not limited to, a touchscreen, a display, a QWERTY keyboard, a numeric keypad, a touchpad, a microphone, and/or speakers. The data processing hardware 132 may execute a graphical user interface (GUI) 139 for display on the user computer 130.

The distributed system 100 may run one or more client services, such as, but not limited to a computing engine, a search engine, email services, video sharing services, and other services. In some implementations, the distributed system 100 includes resources 110, which may include hardware resources 110h and/or software resources 110s. The hardware resources 110h may include data processing devices 112 (also referred to as computing devices) and memory hardware 114 (e.g., non-transitory memory, persistent disks). The software resources 110s may include software applications, software services, application programming interfaces (APIs) or the like. The software resources 110s may reside in the hardware resources 110h. For example, the software resources 110s may be stored in the non-transitory memory 114 and executed by one or more data processing devices 112.

A software application (i.e., a software resource 110s) may refer to computer software that causes a computing device to perform one or more tasks. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory (i.e., memory hardware) 114 may be physical devices used to store programs (e.g., sequences of instructions) or data (e.g., program state information) on a temporary or permanent basis for use by a computing device 112. The non-transitory memory 114 may be volatile and/or non-volatile addressable semiconductor memory Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs) as well as disks or tapes. Examples of volatile memory include, but are not limited to, random access memory (RAM), dynamic random access memory (DRAM), static random access memory (SRAM), and phase change memory (PCM).

Figure 2:
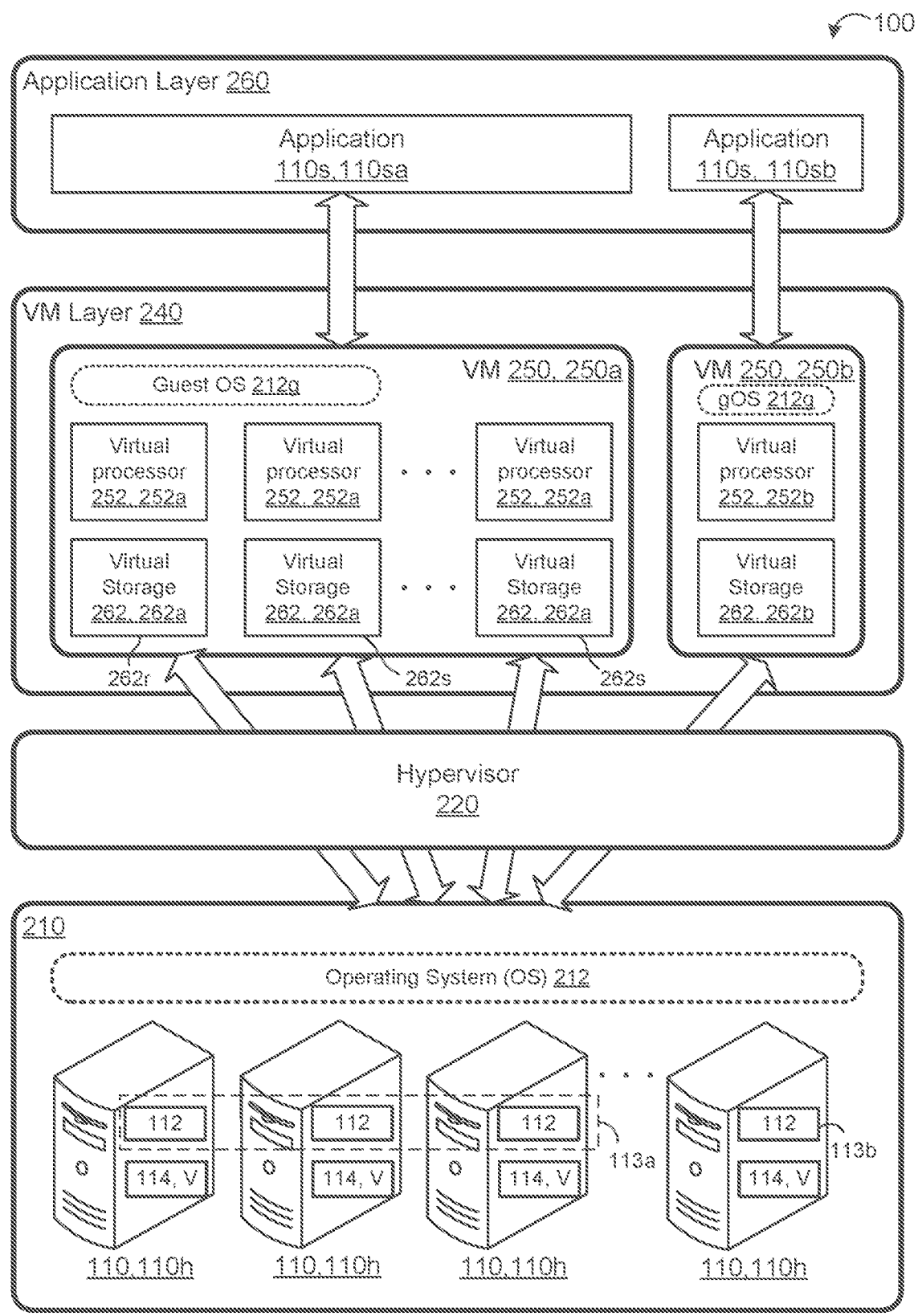
FIG. 2 is a schematic view of an example application layer and virtual machine layer hosted on a distributed system.

In the example shown in FIG. 2, the distributed system 100 includes a collection 210 of resources 110 (e.g., hardware resources 110h), a virtual machine monitor (VMM) 220, a virtual machine (VM) layer 240 executing one or more virtual machines (VMs) 250, and an application layer 260. Each hardware resource 110h may include one or more physical central processing units (pCPU) 112 ("physical processor 112") and memory hardware 114. While each hardware resource 110h is shown having a single physical processor 112, any hardware resource 110h may include multiple physical processors 112. An operating system 212 may execute on the collection 210 of resources 110.

In some examples, the VMM 220 corresponds to a hypervisor 220 (e.g., a Compute Engine) that includes at least one of software, firmware, or hardware configured to create and execute the VMs 250. A computer (i.e., data processing hardware 112) associated with the VMM 220 that executes the one or more VMs 250 may be referred to as a host machine, while each VM 250 may be referred to as a guest machine. Here, the VMM 220 or hypervisor is configured to provide each VM 250 a corresponding guest operating system (OS) 212g having a virtual operating platform and manage execution of the corresponding guest OS 212g on the VM 250. As used herein, each VM 250 may be referred to as an "instance" or a "VM instance". In some examples, multiple instances of a variety of operating systems may share virtualized resources. For instance, a first VM 250 of the Linux® operating system, a second VM 250 of the Windows® operating system, and a third VM 250 of the OS X® operating system may all run on a single physical x86 machine. Additionally, the VMM 220 allows the user 120 to add and/or resize the resources 110 (e.g., memory hardware 114) without handling striping or redundancy. For example, the VMM 220 may attach one or more additional resources and resize (e.g., by increasing) the storage capacity of the memory hardware 114 for the collection 210 of hardware resources 110h when the system 10 needs additional storage/space. In other examples, the VMM 220 may attach multiple smaller resources 110 to separate data of the user 120 into multiple volumes/partitions. Additionally, in order to meet performance and flexibility requirements of the user 120, the user 120 may use additional storage options such as, but not limited to, adding/resizing PDs, local solid state drives (SSDs), cloud storage buckets, or RAM disks.

The VM layer 240 includes one or more virtual machines 250. The distributed system 100 enables the user 120 to launch VMs 250 on demand. A VM 250 emulates a real computer system and operates based on the computer architecture and functions of the real computer system or a hypothetical computer system, which may involve specialized hardware, software, or a combination thereof. In some examples, the distributed system 100 authorizes and authenticates the user 120 before launching the one or more VMs 250. An instance of software, or simply an instance, refers to a VM 250 hosted on (executing on) the data processing hardware 112 of the distributed system 100.

Each VM 250 may include one or more virtual central processing units (vCPUs) 252 ("virtual processor"). In the example shown, a first virtual machine 250a includes a first set 252a of one or more virtual processors 252 and a second virtual machine 250b includes a second set 252b of one or more virtual processors 252. While the second set 252b is shown as only including one virtual processor 252, any number of virtual processors 252 is possible. Each virtual processor 252 emulates one or more physical processors 112. For example, the first set 252a of the one or more virtual processors 252 emulates a first set 113a of one or more physical processors 112, and the second set 252b of the one or more virtual processors 252 emulates a second set 113b of one or more physical processors 112. The application layer 260 includes software resources 110s, 110sa, 110sb (software applications) that may execute on the virtual machine(s) 250.

In a cloud computing engine (e.g., such as the Google® Compute Engine (GCE)) offering Infrastructure as a Service (IaaS), each instance of software (e.g., a virtual machine 250) includes at least one virtual storage device 262 that provides storage capacity for the service on the physical memory hardware 114. For instance, the storage capacity on the physical memory hardware 114 can include persistent disks (PD) that store data for the user 120 across several physical disks (e.g., memory regions 116 (FIG. 10) of the memory hardware 114. More specifically, each virtual storage device 262 of a corresponding VM 250 moves data in sequences of bytes or bits (blocks) to an associated physical block storage volume V on the memory hardware 114. Accordingly, a virtual storage device 262 of a corresponding VM instance 250 provides a storage capacity that maps to corresponding physical block storage volumes V on the memory hardware 114. In some examples, the virtual storage devices 262 support random access to the data on the memory hardware 114 and generally use buffered I/O. Examples include hard disks, CD-ROM drives, and flash drives.

The one or more virtual storage devices 262 for each VM instance 250 may include a root disk 262r (e.g., root persistent disk) and one or more secondary storage disks 262s. The root disk 262r may include a root persistent disk that contains the guest operating system 212g for the VM instance 250, while the one or more secondary storage persistent disks 262 that provide additional storage capacity/space for the VM instance 250. In some implementations, the data processing hardware 112 automatically creates a corresponding root persistent disk 262r when the user 120 creates a VM instance 250. In other implementations, the user 120 creates a standalone root persistent disk 262r and attaches the standalone root persistent disk 262r to the VM instance 250 after creating the VM instance 250. The root persistent disk 262r may expose a block storage volume V with a default storage capacity (e.g., 10 GB) and subsequently allow the user 120 to resize (e.g., increase the storage capacity) the root persistent disk 262r to improve performance and provide additional storage operating system files for the VM instance 250. Additionally or alternatively, the user 120 may subsequently add one or more secondary storage disks 262s to provide additional data storage capacity for applications running on the VM instance 250 as needed.

A new virtual storage device 262 has to attach and mount to the corresponding VM 250 before the operating system 212g associated with the corresponding VM 250 is able to use the available block storage volume V on the memory hardware 114. The process for attaching a virtual storage device 262 to a VM 250 generally includes the user 120 (e.g., via the user computer 130) identifying the virtual storage device 262 and the corresponding VM 250 and then commanding the data processing hardware 112 of the distributed system 100 to attach the new virtual storage device 262 to the VM 250. In some examples, a logical connection from the virtual storage device 262 to the hypervisor 220 hosting the corresponding VM 250 permits the virtual storage device 262 to attach to the VM 250. For instance, the logical connection may include a network link such as the iSCSI protocol. Here, the attaching of the virtual storage device 262 to the VM 250 exposes a new physical block storage volume V on the memory hardware 114 to the hypervisor 220 (e.g., host). Thereafter, the physical block storage volume V exposed by the associated virtual storage device 262 may require partitioning and/or formatting for use by the guest operating system 212g running on the VM instance 250. The formatting process can be different for different OS instances (e.g., Linux® instances or Windows® instances).

After attaching the virtual storage device 262, the data processing hardware 112 mounts the physical block storage volume V of the corresponding virtual storage device 262 to the VM instance 250 so that the operating system 212, 212g can logically map a directory structure (e.g., file system) for the block storage volume V to the virtual storage device 262.

Described in greater detail below, the user 120 may resize virtual storage devices 262, 262r, 262s when the VMs 250 require additional storage space, and/or add/attach multiple secondary disks 262s when the user 120 needs to separate data into unique partitions or requires additional storage space for applications running on the VMs 250. The process for resizing root disks 262r may be different than the process for resizing secondary storage disks 262s. The user 120 can resize disks 262, 262r, 262s at any time, regardless of whether the disk 262, 262r, 262s is attached to a running VM 250 (instance). After resizing the virtual storage devices 262, the user 120 may need to resize the file system associated with the VM instance 250 so that the operating system 212, 212g can access the additional block storage volume V of the memory hardware 114. In some implementations, the operating system 212, 212g automatically resizes the file system in response to resizing the virtual storage device 262 for the VM instance 250. For instance, the file system may automatically resize once the corresponding VM instance 250 restarts. In some examples, resizing a root persistent disk 262 containing the operating system 212g causes automatic resizing of the file system for the corresponding VM instance 250. In the example shown in FIG. 2, the first VM 250a has a first collection 262a of virtual storage devices 262, 262r, 262s that expose corresponding block storage volumes V that have been added and/or resized while the first VM 250a executes on the data processing hardware 112. On the other hand, the second VM 250b includes a second collection 262b of one virtual storage device 262 exposing a corresponding block storage volume V, which may be resized at later time and/or secondary storage disks 262s may be added when the second VM 250b requires additional storage capacity.

Instantiating a Virtual Machine

Figure 3:
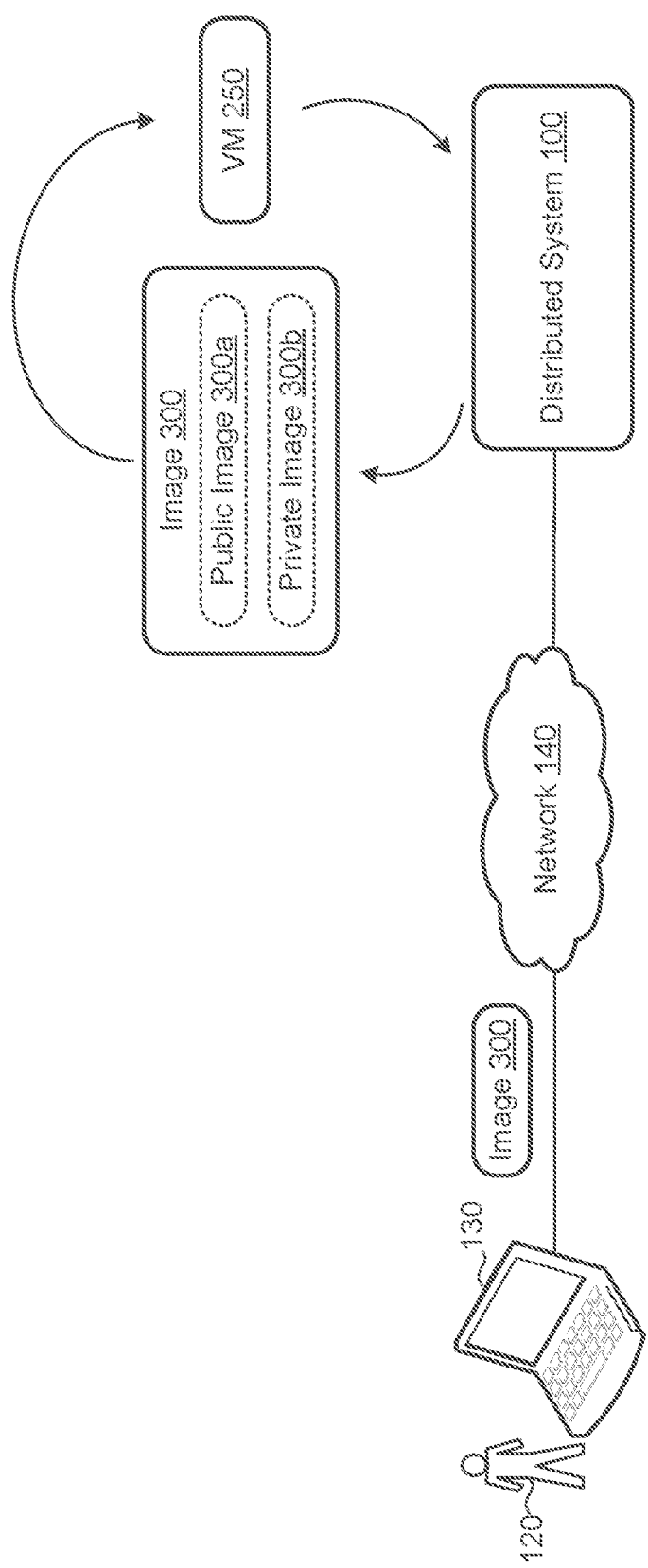
FIG. 3 is a schematic view of an example of creating a virtual machine from an image on a distributed system.
Figure 4:
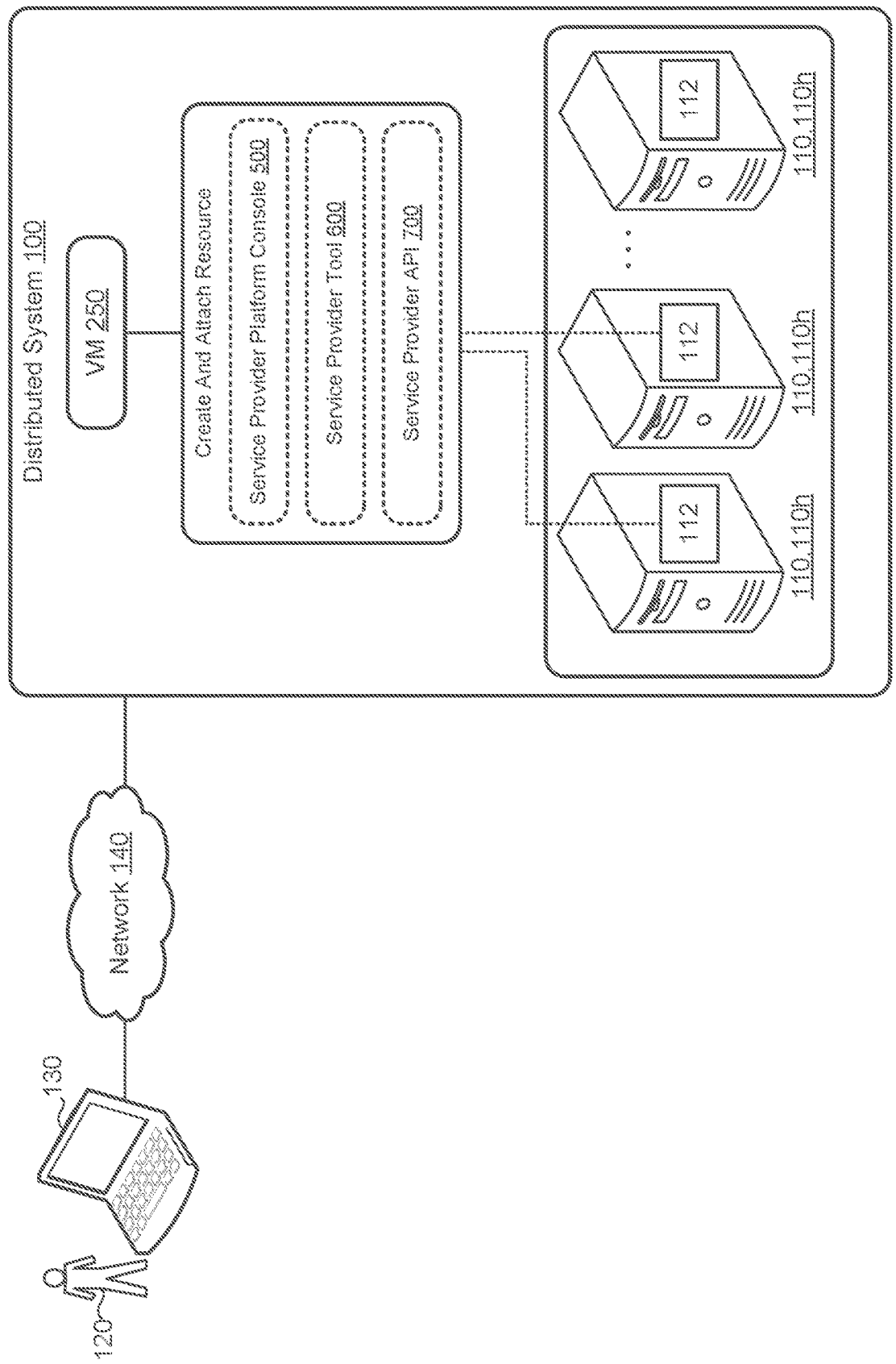
FIG. 4 is a schematic view of an example of creating and attaching a resource on a distributed system.

Referring to FIG. 3, in some examples, the user 120 creates the VM 250 using an image 300 or a snapshot. The image 300 or snapshot is associated with a corresponding operating system 212. The user 120 may specify the image 300 when creating the VM 250. The distributed system 100 uses the specified image 300, which is associated with a corresponding operating system 212, to create a root resource 110 for the VA 250. An image 300 generally includes a boot loader, the corresponding operating system 212, and a root file system. Images 300 may be public images 300a or private images 300b. Public images 300a may be provided by a service provider, open-source communities, and third-party vendors. Private images 300b may be proprietary and available only to specific projects or users 120. For example, a user 120 may create a private image 300b from an existing root resource 110 or build a new private image 300b from scratch. Once the private image 300b is created, the user 120 may create a VM 250 using the private image 300b. In some examples, images 300 are grouped into image families. The image families group related images 300 and multiple versions of the images 300 together. The distributed system 100 may automatically start the VA 250 upon instantiation.

Creating and Attaching a Resource

Figure 5:
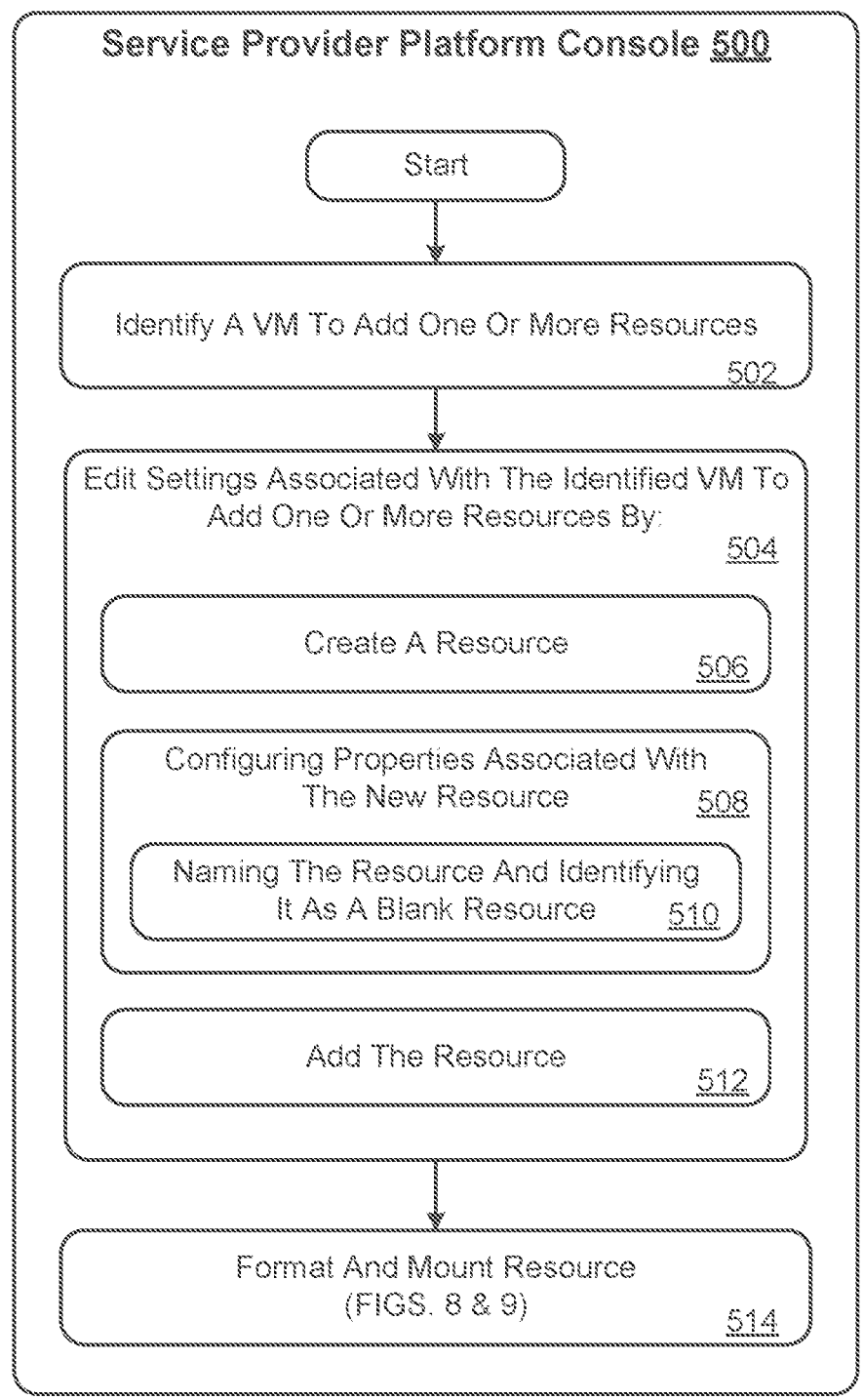
FIG. 5 is a schematic view of an example arrangement of operations executable by a service provider platform console.

Referring to FIGS. 1 and 4-7, after the user 120 creates the VM 250, the user 120 may create and attach one or more resources 110 to the VM 250 using a service provider platform console 500 (e.g., Google Cloud Platform Console®) (FIG. 5), a service provider tool 600 (FIG. 6), a service provider application programming interface (API) (FIG. 7), or other methods. Referring to FIG. 5, the service provider platform console 500 allows the user 120 to build, test, deploy, and scale applications, websites, and/or services on the distributed system 100 of the service provider. The service provider platform console 500 allows the user 120 to interact with and provide information to the service provider platform console 500 via the GUI 139 displayed on the user computer 130.

At block 502, the service provider platform console 500 prompts the user 120 to identify a VM 250 (e.g., enter a name of the VM 250) via the GUI 139 for which to add one or more additional resources 110. At block 504, the user 120 edits the resources 110 of the VM 250. For instance, the user 120 may instruct the service provider platform console 500 to add additional resources 110 to the identified VM 250. At block 506, the user 120 creates a resource 110 the user 120 wants to add to the identified VM 250, and at block 508, the user configures properties associated with the resource 110. For instance, at block 510, the user 120 may use the GUI 139 to enter a name for the newly created resource and identify the resource as a blank resource (e.g., a "Blank Disk"). The new resource may correspond to a virtual storage device 262 (e.g., persistent disk) that exposes a new physical block storage volume V on the memory hardware 114. At block 512, the service provider platform console 500 attaches the resource 110 to the identified VM 250. In some examples, the user 120 inputs a save command via the GUI 139, thereby triggering the service provider platform console 500 to apply the changes to the VM 250 and attach the new resource 110 to the VM 250. After attaching the new resource 110 to the VM 250, the service provider platform console 500, at block 514, formats and mounts the resource 110 so that the distributed system 100 is able to use the newly added resource 110. Formatting and mounting the resource 110 is described in greater detail below with reference to FIGS. 8 and 9.

Figure 6:
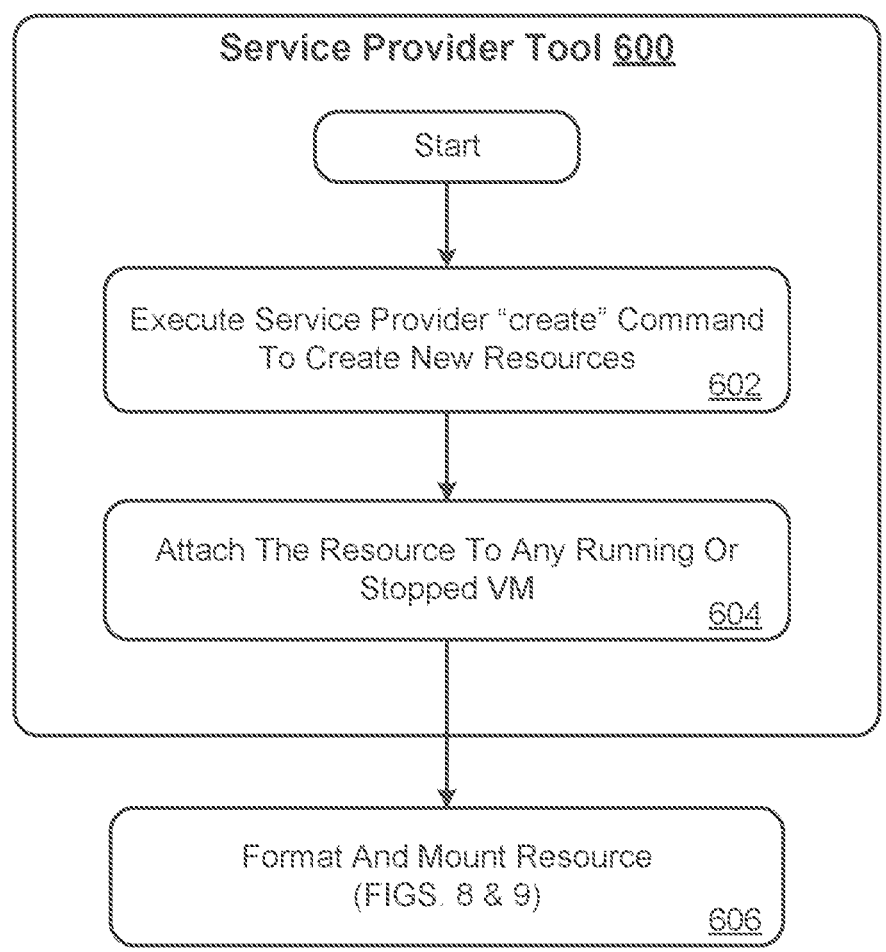
FIG. 6 is a schematic view of an example arrangement of operations executable by a service provider tool.

Referring to FIG. 6, the service provider tool 600 provides another method for creating and attaching a new resource 110 to a VM 250. The service provider tool 600 may include a software development kit (SDK) providing a set of software development tools for creating the new resource 110. For instance, the SDK may specify the operating system 212 for the corresponding VM 250. The service provider tool 600 may be a unified command-line tool that includes features like statement auto-completion, in-place updating, extensive man page style help, human-readable and machine-parsable output formats, and integration with cloud computing SDK, for example. Therefore, to create and attach a resource 110 using the service provider tool 600, at block 602, the user 120 executes a CREATE command via the GUI 139 to create the new resource 110. The new resource may correspond to a virtual storage device 262 (e.g., persistent disk) that exposes anew physical block storage volume V on the memory hardware 114. In some examples, the user 120 wants to add a persistent disk (e.g., a solid-state drive (SSD)) for additional throughput or input/output operations per second (IOPS). In some examples, the user 120 may enter the following commands via the GUI 139:

gcloud compute disks create [DISK_NAME]--size [DISK_SIZE]--type
   [DISK_TYPE]
   where.
      [DISK_NAME] is the name of the new disk;
      [DISK_SIZE] is the size of the new disk in GB; and
      [DISK_TYPE] is the type of persistent disk. Either pd-standard or pd-ssd.

At block 604, after creating the resource 110, the user 120 instructs the service provider tool 600 to attach the resource 110 to any running or stopped VM 250. In some examples, the user 120 enters the following commands via the GUI 139:

gcloud compute instances attach-disk [INSTANCE_NAME]--disk [DISK_NAME]
   where:
      [INSTANCE_NAME] is the name of the instance where the user 120 is adding the new resource 110 (e.g., a persistent disk); and
      [DISK_NAME] is the name of the new disk that the user 120 is attaching to the instance (VM 250).

At block 606, after attaching the new resource to the VM 250, the service provider tool 600 formats and mounts the resource 110, so that the distributed system 100 is able to use the newly added available resource 110. Formatting and mounting the resource 110 is described in greater detail below with reference to FIGS. 8 and 9.

Figure 7:
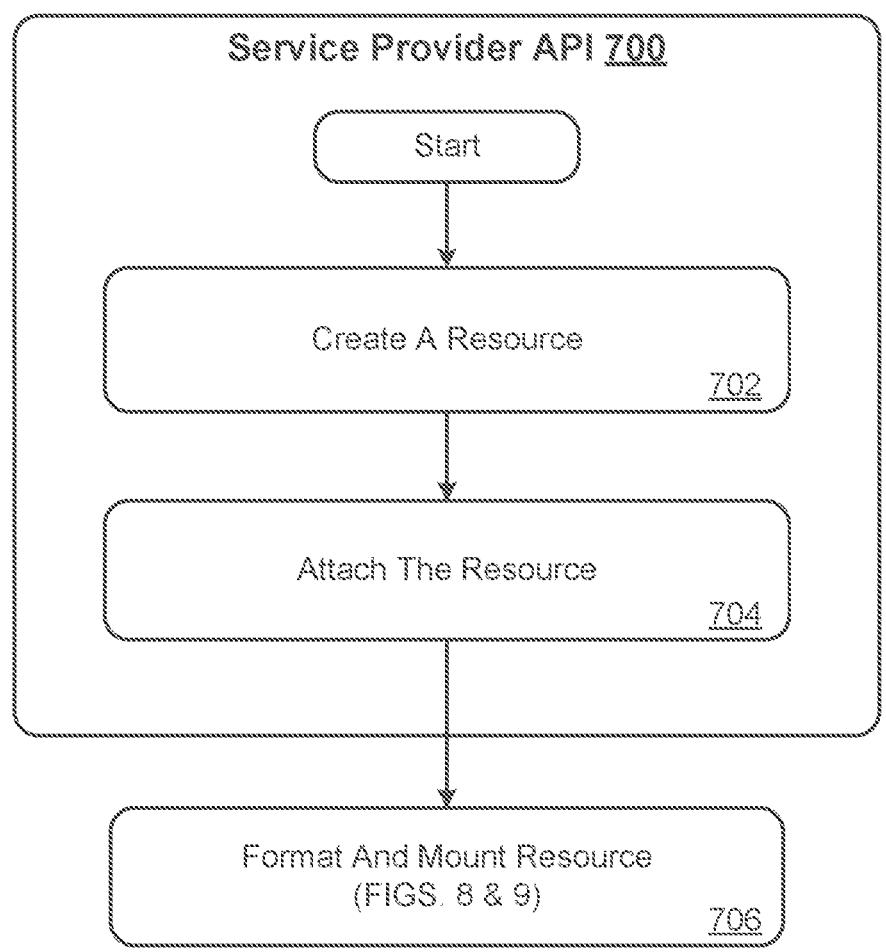
FIG. 7 is a schematic view of an example arrangement of operations executable via a service provider application programming interface (API).

Referring to FIG. 7, the service provider API 700 provides another method for creating and attaching a new resource 110 to a VM 250. The API 700 includes a set of subroutine definitions, protocols, and/or tools for building software and applications. Accordingly, the API 700 may facilitate the development of a program/project by providing the user with building blocks for developing the program/project. At block 702, the user 120 creates the new resource 110 by constructing a request (e.g., a POST request). A POST request is a request method supported by the Hyper Transfer Protocol (HTTP) for use by the World Wide Web that requests a web server to accept and store data included in a body of the POST request. In some examples, the request may include commands to initialize the new resource 110 and specify a size and type of the new resource 110. The new resource may correspond to a virtual storage device 262 (e.g., persistent disk) that exposes a new physical block storage volume V on the memory hardware 114. For example, the request may specify the size and type with "diskSizeGb" and "type" properties. In addition, since the resource 110 is a data resource 110 (e.g., persistent disk), the user 120 may be precluded from including a "sourceImage" property, which creates a blank disk. In some examples, the user 120 enters the following commands via the GUI 139:

POST
https://www.googleapis.com/compute/v1/projects/[PROJECT_ID]/zones/[ZONE]/disks
{
"name": "[DISK_NAME]".
"sizeGb": "[DISK_SZE]"
"type": "zones/[ZONE]/diskTypes/[DISK_TYPE]"
}
where:
[PROJECT_ID] is a project ID,
[ZONE] is the zone where the instance (VM 250) and new disk (resource 110) are located;
[DISK_NAME] is the name of the new disk;
[DISK_SIZE] is the size of the new disk in GB; and
[DISK_TYPE] is the type of persistent disk. Either pd-standard or pd-ssd.

At block 704, the user 120 may construct another request, e.g., a POST request, to attach the new resource 110 to the VM 250. For example, the user 120 may construct a POST request using "compute.instances.attachDisk" and include a URL to the resources 110 as follows:

POST
https://www.googleapis.com/compute/v1/projects/[PROJECT_ID]/zones/[ZONE]/instances/[INSTANCE_NAME]/attachDisk
{

```
"source":        "/compute/v1/projects/my-project/zones/
    [ZONE]/disks/[DISK_NAME]"
}
```
where:

[PROJECT_ID] is the project ID;

[ZONE] is the zone where the instance (VM 250) and new disk (resource 110) are located;

[INSTANCE_NAME] is the name of the instance where the user 120 is adding the new persistent disk; and

[DISK_NAME] is the name of the new disk.

At block 706, after attaching the new resource 110 to the VM 250, the service provider API 700 formats and mounts the resource 110, so that the system 10 is able to use the newly added available resource 110. Formatting and mounting the resource 110 is described in greater detail below with reference to FIGS. 8 and 9.

Formatting and Mounting a Resource

After the user 120 creates and attaches the resource 110 to the VM 250, i.e., by using one of the service provider platform console 500, the service provider tool 600, or the service provider API 700, the user 120 may format and mount the resource 110 so that the distributed system can use the additional available storage space. Formatting and mounting the resource 110 may be applied differently in a Linux® VM 250 than in a Windows® VM 250 or other VM environment.

Figure 8:
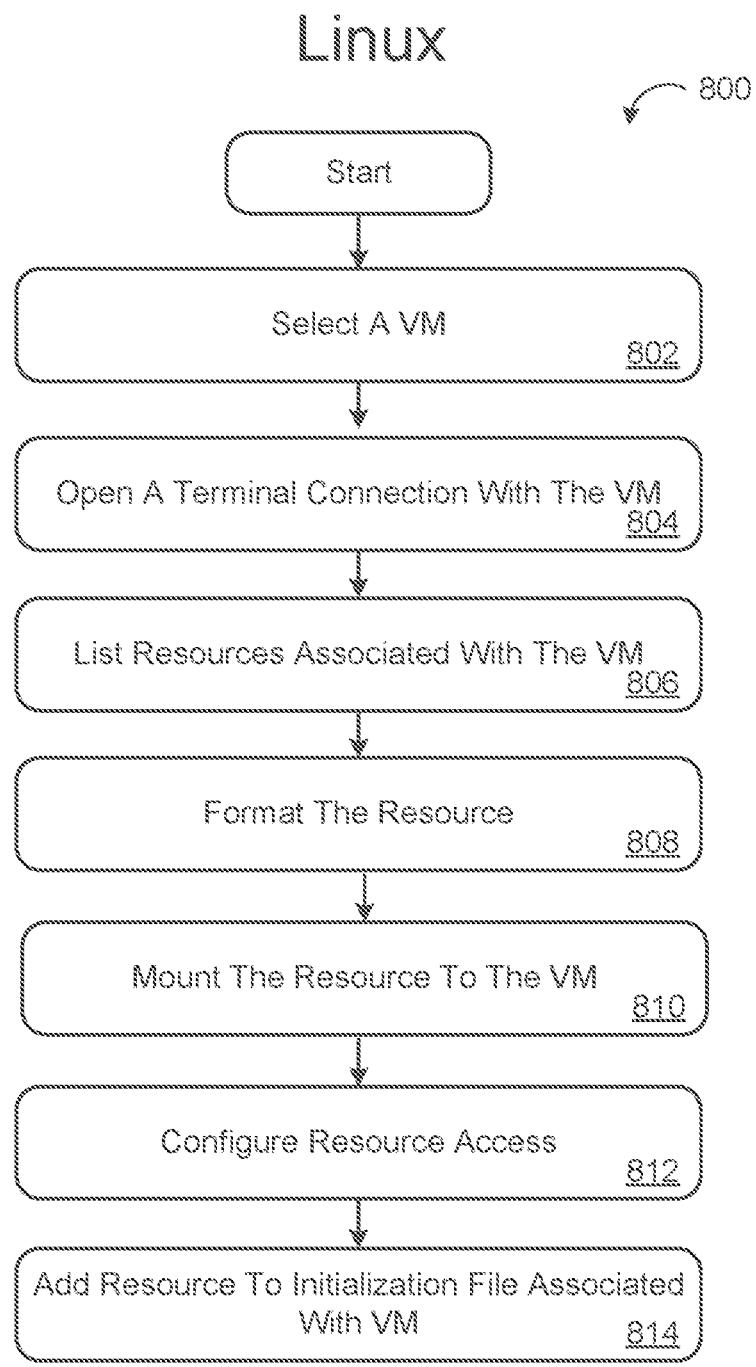
FIG. 8 is a schematic view of an example arrangement of operations for a method of formatting and mounting the resource for a Linux® virtual machine.

FIG. 8 illustrates an example arrangement of operations for a method 800 of formatting and mounting the resource 110 for a Linux® VM 250. In some implementations, the user 120 formats and mounts the new resource 110 to the Linux® VM 250 using any partition format and configuration. For example, the user 120 may instruct the system to create a single "ext4" file system without a partition table, which allows for resizing the resource 110 at a later time to add more storage. For instance, the virtual storage device 262 may expose a physical block storage volume V on the memory hardware 114 of the new resource 110. The physical block storage volume V may include a default storage capacity that may be resized (e.g., increased) at a later time if the VM 250 requires additional storage capacity. At block 802, the user 120 selects a VM page via the GUI 139. At block 804, the user 120 selects a Secure Shell (SSH) button associated with the newly added resource, which allows a browser to open a terminal connection to the VM 250. At block 806, in the opened terminal, the user 120 executes a list command (e.g., an "ls" command) to list the resources 110 that are attached to the VM 250 and find the resource 110 that the user 120 wants to format and mount. For example, the user 120 may execute the following:

$ ls/dev/disk/by-id
google-example-instance
scsi-0Google_PersistentDisk_example-instance
google-example-instance-part1
scsi-0Google_PersistentDisk_example-instance-part1
google-[DISK_NAME]
scsi-0Google_PersistentDisk_[DISK_NAME];

where [DISK_NAME] is the name of the persistent disk that the user 120 attached to the instance.

The disk II) usually includes the name of the resource 110 with a service provider prefix, e.g., a "google-" prefix or ascsi-0Google_PersistentDisk prefix. The user 120 may use either ID to specify the resource 110, or use the ID with the service provider prefix.

At block 808, the user 120 formats the resource 110 using a single "ext4" file system that uses an mkfs tool. The mkfs tool is configured to build a Linux® file system on a device, such as a hard disk partition. The mkfs command deletes all data from the specified resource 110. The user 120 may use formatting options specific to the resource 110, for example:

sudo mkfs.ext4 -F -E lazy_itable_init=0,lazy_journal_init=0,discard/dev/disk/by-id/google-[DISK_NAME]

where [DISK_NAME] is the name of the persistent disk that you are formatting.

At block 810, the user 120 uses a mount tool to mount the resource 110 to the VM 250 with a discard option enabled as follows:

sudo mount -o discard,defaults/dev/disk/by-id/google-[DISK_NAME]/mnt/disks/[MNT_DIR]

where [DISK_NAME] is the name of the persistent disk being formatted and

[MNT_DIR] is the directory where the user 120 will mount the persistent disk.

At block 812, the user 120 configures read and write access to the resource 110. For example, the user 120 may grant write access for one, multiple users, or all users. An example of granting access to all users 120 includes:

sudo chmod a+w /mnt/disks/[MNT_DIR]

where [MNT_DIR] is the directory where the user 120 mounted the persistent disk.

At block 814, the user 120 may add the resource 110 to one or more initialization files, e.g., /etc/fstab file, associated with the VM 250, so that the distributed system 100 can automatically mount the resource 110 when the instance 250 restarts. In some examples, the user 120 instructs the distributed system 100 to execute a command, e.g., blkid command, to find a Universal Unique Identifier (UUID) for the file system on the distributed system 100 and edit the initialization file(s), e.g., /etc/fstab file, to include the identified UUID with the mount options. In some examples, this step completes by executing the following command echo UUID=sudo blkid -s UUID -o value/dev/disk/by-id/google-[DISK_NAME]/mnt/disks/[MNT_DIR]   ext4   discard,defaults 1 1 |sudo tee -a/etc/fstab where [DISK_NAME] is the name of the persistent disk that the user 120 wants to automatically mount and [MNT_DIR] is the directory where the user 120 mounted the persistent disk. Once executed, the user 120 may write files to the newly added virtual storage resources 262.

Figure 9:
FIG. 9 is a schematic view of an example arrangement of operations for a method of formatting and mounting the resource for a Windows® virtual machine.

FIG. 9 illustrates an example arrangement of operations for a method 900 of formatting and mounting the resource 110 for a Windows® VM 250. In some implementations, the user 120 formats and mounts the new resource 110 on the Windows® VM 250 using a Windows® Disk management tool. The Windows® disk management tool is configured to partition disks and resources. At block 902, the Windows® disk management tool allows the user 120 to click a remote desktop (RDP) button associated with the VM 250 that has the added resource 110. The GUI 139 opens an RDP connection to the VM 250. At block 904, the user 120 may select an option in the RDP connection for a Disk management menu. If the user 120 has not initialized the resource 110 previously, then the Windows® disk management tool prompts the user to select a partitioning scheme for the new resource 110. At block 906, the resource 110 initializes and the user 120 may select and configure the new resource 110. As such, the user 120 may use any partition format to speed up the formatting speed In some examples, the user 120 sets a maximum partition size of the resource 110. At block 908, the Windows® disk management tool may provide the user 120 with a status check that allows the user 120 to check the status of the new resource 110. As such, if the status of the new resource 110 is good then the user 120 can start writing files on the new resource 110.

Resizing a Resource

The user 120 may want to resize a resource 10, and more specifically increase the size/capacity of a block storage capacity V of resource 110 when the VM 250 needs more storage space. In some examples, the user resizes a resource 110 (e.g., block storage volume V on the memory hardware 114) containing a root persistent disk 252r to provide additional storage capacity for an operating system 212 of the VM 250. Additionally, the user 120 may instruct the distributed system 100 to attach multiple secondary resources 110 when the user 120 wants to separate the data into unique partitions/volumes or an application running on the VM 250 requires additional space. In some examples, resizing a root persistent disk resource 110 is different than resizing secondary resources 110. As will be described, resizing a block storage volume V may occur at any time, regardless of whether the resource 110 associated with the block storage volume V is attached to a running VM 250. There are at least three methods that may be used to resize a resource 110 associated with a block storage volume V of a VM 250: (1) using the service provider platform console 500 (e.g., Google Cloud Platform Console); (2) using the service provider tool 600; or (3) using the service provider API 700.

The service provider platform console 500 provides the user 120 with a resource GUI that allows the user 120 to resize the resource 110 (e.g., block storage volume V) by selecting virtual storage device 262 exposing the block storage volume V and inputting a new size/capacity for the block storage volume V on the resource 110. For instance, resizing the block storage volume V may include increasing a storage capacity of the block storage volume V from a default storage capacity to a new storage capacity greater than the default storage capacity. The user 120 may then save the updated information. Once the user 120 resizes the resource 110, the user 120 may also resize the file system, so that the operating system can access the additional space of the resource 110. In some examples, the file system automatically resizes when the resource 110 resizes.

The service provider tool 600 may include a disk resize command that allows the user 120 to specify the size of the resource 110 (e.g., in GB). An example command may include:

gcloud compute disks resize [DISK_NAME]--size [DISK_SIZE]

where

[DISK_NAME] is the name of the disk that the user 120 is resizing; and

[DISK_SIZE] is the new size for the disk in GB.

Once the user 120 resizes the resource 110, the user 120 may also resize the file system, so that the operating system 212 can access the additional space of the resource 110. In some examples, the file system automatically resizes when the resource 110 resizes.

The service provider API 700 may include a request to specify the size of the resource 110. For example, the user 120 may construct a POST request to the compute disks.resize method. In the request body, the user 120 may specify the sizeGb parameter and set it to the desired disk size in GB. An example request may include:

POST
https://www.googleapis.com/compute/v1/projects/[PROJECT_ID]/zones/[ZONE]/disks/[DISK_NAME]/resize
{
"sizeGb": "[DISK_SIZE]"
}
where:

[PROJECT_ID] is the project ID;

[ZONE] is the zone where the disk is located;

[DISK_NAME] is the name of the disk that the user 120 is resizing; and

[DISK_SIZE] is the new size for the disk in GB.

Resizing File System or Partitions on a Persistent Disk

After the user 120 resizes the resource 110, the user 120 may also resize the file system, so that the operating system 212 can access the additional space of the resource 10. In some examples, resizing the resource 110 triggers a resize of the file system automatically. Before resizing the file system, the user 120 may create a snapshot of the resource 110. Snapshots are useful for periodic backup of the resources 110 and can be created from the resources 110 even while the resources 110 are attached to a running VM 250.

On a Linux® system, the user 120 may open a terminal connection to the VM 250, similar to opening a terminal connection discussed above. Once the terminal connection is opened, the user 120 may extend the size of the file system on the resized resource 110. In some examples, the resource 110 includes a partition table or uses a volume management system. In this case, the user 120 may resize the partitions first. If the user 120 formatted the resource 110 with a single "ext4" file system and no partition table, then the user 120 may run a "resize2fs" command to resize the file system to include the extra resource space. An example includes:

sudo resize2fs/dev/disk/by-id/google-[DISK._NAME]

where [DISK_NAME] is the name of the disk where the user 120 is resizing the file system.

In some implementations, the user 120 executes a "df -h" command to verify that the file system is resized. An example includes:

df-h/dev/disk/by-id/google-[DISK_NAME]

Filesystem Size Used Avail Use % Mounted on

/dev/sdb 246G 60M 234G 1%/mnt/disks/[MNT_DIR]

where [DISK_NAME] is the name of the disk where the user 120 wants to see the file system configuration, and [MNT_DIR] is the directory where the user 120 mounted the persistent disk.

The "df" command displays disk sizes in gigabyte GB units, which is a different than the gibibyte (GiB) unit that Compute Engine uses.

A user 120 may resize partitions on a Windows® VM 250 using the Windows® Disk management tool. The user 120 may open an RDP connection as previously explained, and select a Disk Management option. The user 120 may refresh the disk management tool so that it recognizes the additional space on the resources 110. The user 120 may select the resource 110 and extend its block storage volume V by selecting "extend volume" option displayed by way of the GUI 139.

The Windows® disk management tool allows the user 120 to click a remote desktop (RDP) button associated with the VM 250 that has the added resource 110 via the GUI 139 to open an RDP connection to the VM 250. The Windows® disk management tool may provide the user 120 with a status check that allows the user 120 to check the status of the new resource 110 and its partition. As such, if the status of the new resource 110 is good, then the user 120 can use the extra block storage volume on the new resource 110 to store data.

Setting Auto-Delete State of a Resource

In some implementations, read-write resources 110 may be automatically deleted when the associated VM 250 is deleted. This behavior is controlled by an "autoDelete" property on the VM 250 for the attached resources 110 and may be updated at any time In addition, the user 120 may prevent a resource 110 from being deleted by marking the "autoDelete" value as false.

Share a Resource Between Multiple VMS

In some implementations, the user 120 may attach a non-root resource 110 to more than one VM 250 in a read-only mode. This allows the user 120 to share static data between multiple VMs 250. Replicating data between multiple VMs 250 is generally more expensive than sharing the static data between the VMs 250. Therefore, it is beneficial to share the data. If the user 120 wants to attach a resource 110 to more than one VMs 250, then all those VMs 250 may have to attach the resource 110 in the read-only mode. As such, a user 120 has to detach data that is read-write from a VM 250 before reattaching it to multiple VMs.

Figure 10:
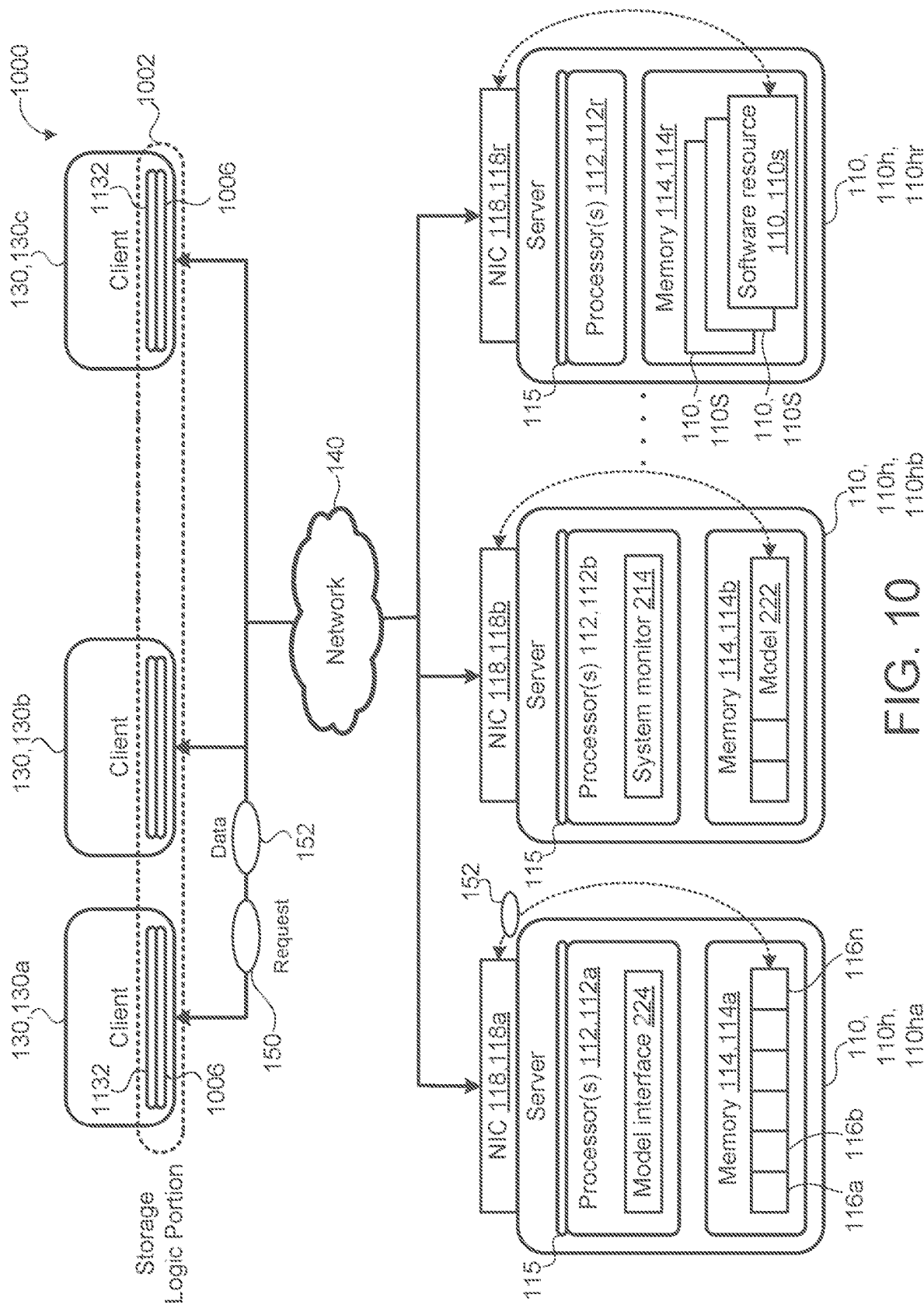
FIG. 10 is a schematic view of an example distributed system having scalable resources.

FIG. 10 illustrates an example distributed system 1000. The distributed system 1000 includes resources 110. The resources 110 include loosely coupled hardware resources 110h (e.g., data processing devices, such as computers or servers), each having a physical processor 112 (e.g., one or more central processing units (CPUs) or other computing resource) in communication with storage resources 114 (e.g., memory, flash memory, dynamic random access memory (DRAM), phase change memory (PCM), and/or disks having spindles) that may be used for caching data 152. A storage abstraction (e.g., key/value store or file system) overlain on the storage resources 114 allows scalable use of the storage resources 114 by one or more clients 130, 130a-n (e.g., user computers). The clients 130 may communicate with the resources 110 through a network 140 (e.g., via RPC).

The distributed system 1000 may include multiple layers of redundancy where data 152 is replicated and/or encoded and stored in multiple data centers. Data centers (not shown) house computer systems and their associated components, such as telecommunications and storage systems. Data centers usually include backup power supplies, redundant communications connections, environmental controls (to maintain a constant temperature), and security devices. Data centers may be large industrial scale operations that use a great amount of electricity (e.g., as much as a small town). Data centers may be located in different geographical locations (e.g., different cities, different countries, and different continents). In some examples, the data centers, or portions thereof, requires maintenance (e.g., due to a power outage or disconnecting a portion of the storage system for replacing parts, or a system failure, or a combination thereof). The data 152 stored in these data centers, and in particular, the distributed system 1000 may be unavailable to users/clients 120, 130 during the maintenance period resulting in the impairment or halt of a user's operations. Therefore, it is desirable to provide a distributed system 1000 capable of efficiently using the storage resources 114 of the hardware resources 110h during maintenance and/or certain data center hardware/software failures without moving the data 152 in advance of such a maintenance or failure. The distributed system 1000 may adjust a load of the available resources 110, and jobs of the adjusted load may be executed in a predefined order, such as high-availability jobs before the low-availability jobs.

In some implementations, the distributed system 1000 is "single-sided," eliminating the need for any server jobs for responding to remote procedure calls (RPC) from clients 130 to store or retrieve data 152 on their corresponding hardware resources 110h and may rely on specialized hardware to process remote requests 150 instead. "Single-sided" refers to the method by which most of the request processing on the hardware resources 110h may be done in hardware rather than by software executed on physical processors 112 of the hardware resources 110h. Rather than having a physical processor 112 of a hardware resource 110h (e.g., a server) execute a server process 115 that exports access of the corresponding storage resource 114 (e.g., non-transitory memory) to client processes 1132 executing on the clients 130, the clients 130 may directly access the storage resource 114 through a network interface controller (NIC) 18 of the hardware resource 110h. In other words, a client process 1132 executing on a client 130 may directly interface with one or more storage resources 114 without requiring execution of a routine of any server processes 115 executing on the physical processors 112.

This single-sided distributed storage architecture offers relatively high-throughput and low latency, since clients 130 can access the storage resources 114 without interfacing with the physical processors 112 of the hardware resources 110h. This has the effect of decoupling the requirements for storage 114 and CPU cycles that typical two-sided distributed systems carry. The single-sided distributed system 1000 can utilize remote storage resources 114 regardless of whether there are spare CPU cycles on that hardware resource 110h; furthermore, since single-sided operations do not contend for server physical processor 112 resources, a single-sided system can serve requests 150 with very predictable, low latency, even when hardware resources 110h are running at high CPU utilization. Thus, the single-sided distributed system 1000 allows higher utilization of both cluster storage 114 and physical processor 112 resources than traditional two-sided systems, while delivering predictable, low latency.

In some implementations, the distributed system 1000 includes a storage logic portion 1002, (e.g., encoding system), a data control portion, and a data storage portion. The storage logic portion 1002 may include a transaction application programming interface (API) 1006 (e.g., a single-sided transactional system client library) that is responsible for accessing the underlying data 152, for example, via RPC or single-sided operations. The data control portion may manage allocation and access to storage resources 114 with tasks, such as allocating storage resources 114, registering storage resources 114 with the corresponding network interface controller 118, setting up connections between the client(s) 130 and the hardware resources 110h, and handling errors in case of machine failures, etc. The data storage portion may include the loosely coupled hardware resources 110h The distributed system 1000 may store data 152 in dynamic random access memory (DRAM) 114 and serve the data 152 from the remote hardware resource 110h via remote direct memory access (RDMA)-capable network interface controllers 118. A network interface controller 118 (also known as a network interface card, network adapter, or LAN adapter) may be a computer hardware component that connects a physical processor 112 to the network 140. Both the hardware resources 110h and the clients 130 may each have a network interface controller 118 for network communications. A host process 115 executing on the physical processor 112 of the hardware resource 110h registers a set of remote direct memory accessible regions 116a-n of the memory 114 with the network interface controller 118. The host process 115 may register the remote direct memory accessible regions 116a-n of the memory 114 with a permission of read-only or read/write. The network interface controller 118 of the hardware resource 110h creates a client key for each registered memory region 116a-n.

The single-sided operations performed by the network interface controllers 118 may be limited to simple reads, writes, and compare-and-swap operations, none of which may be sophisticated enough to act as a drop-in replacement for the software logic implemented by a traditional cache server job to carry out cache requests and manage cache policies. The transaction API 1006 translates commands, such as look-up or insert data commands, into sequences of primitive network interface controller operations. The transaction API 1006 interfaces with the data control and data storage portions of the distributed system 1000.

The distributed system 1000 may include a co-located software process to register memory 114 for remote access with the network interface controllers 118 and set up connections with client processes 1132. Once the connections are set up, client processes 1132 can access the registered memory 114 via engines in the hardware of the network interface controllers 118 without any involvement from software on the local physical processors 112 of the corresponding local hardware resources 110h.

In the example shown, the distributed system 1000 includes a first hardware resource 110ha and a second hardware resource 110hb. The first hardware resource 110ha includes a first physical processor 112a, a first memory 114a and a first NIC 118a. Similarly, the second hardware resource 110hb includes a second physical processor 112b, a second memory 114b and a second NIC 118b. The distributed system 1000 may include a remote hardware resource 110hr. The remote hardware resource 110hr may be located at a different location that the first hardware resource 110ha and the second hardware resource 110hb (e.g., in a different city, state, country or continent) The remote hardware resource 110hr includes a remote physical processor 112r, a remote memory 114r and a remote NIC 118r.

The second memory 114b stores a model 222. The model 222 stores relationships between the resources 110 of the distributed system 1000. The second physical processor 112b implements a system monitor 214 that manages the model 222. The system monitor 214 can update the model 222 by modifying existing relationships stored in the model 222, purging existing relationships stored in the model 222, or adding new relationships to the model 222. The first processor 112a implements a model interface 224. The model interface 224 can access the model 222 even though the model interface 224 and the model 222 are in different hardware resources 110h. Further, the model interface 224 may access the model 222 directly through the NIC 118b without communicating with the second physical processor 112b. Advantageously, the model interface 224 can access the model 222 even when the second physical processor 112b may be unavailable or busy. The clients 130 can access the model 222 through the model interface 224.

The system monitor 214 can detect state changes in resources 110 including hardware resources 110h and software resources 110s stored in the remote memory 114r. The system monitor 214 may detect state changes of the software resources 110s via the remote NIC 118r without communicating with the remote physical processor 112r. Advantageously, the system monitor 214 can detect state changes of the software resources 110s even when the remote physical processor 112r is unavailable or busy. The distributed system 1000 may be configured to maintain and update the model 222. In other words, unlike the example distributed system 1000 system 100 depicted in FIG. 1, the modeling system is a part of the distributed system 1000.

Figure 11:
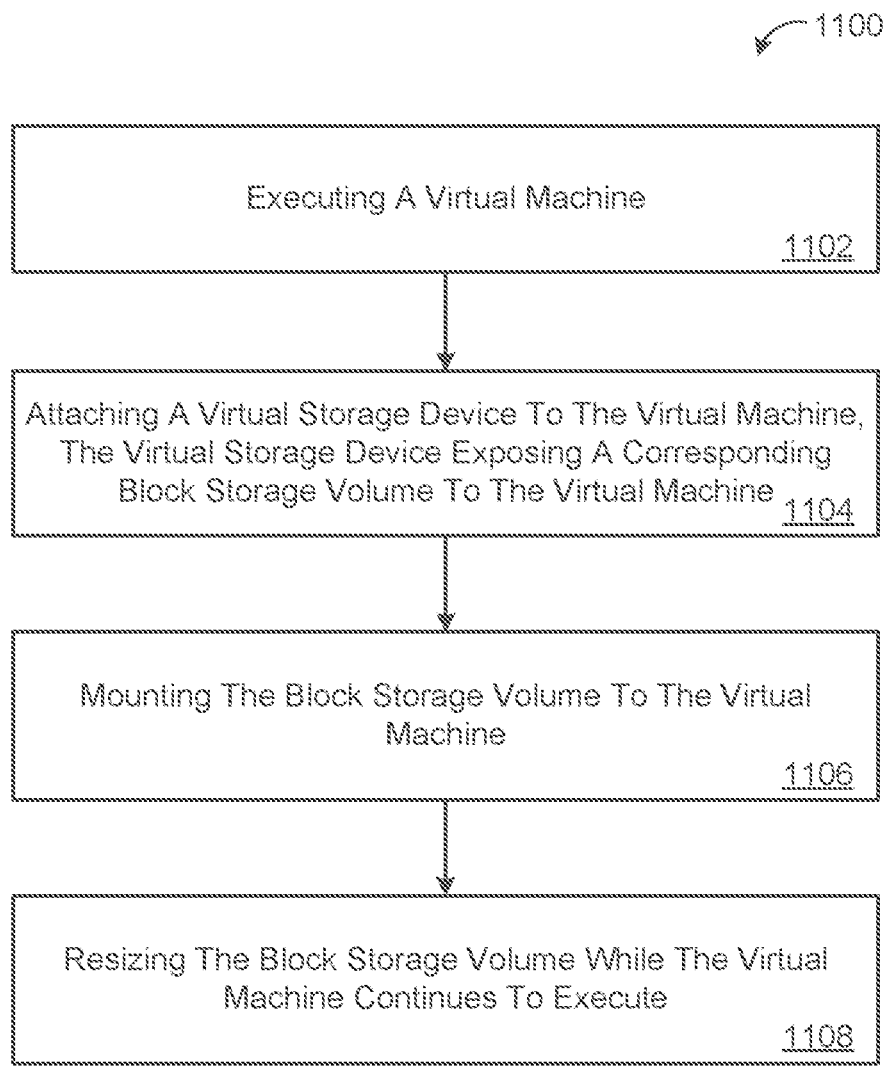
FIG. 11 is a schematic view of an example arrangement of operations for a method of resizing available storage resources of a virtual machine.

FIG. 11 is a schematic view of example operations for a method 1100 of resizing a block storage volume V for a virtual machine (VM) 250 (e.g., an instance of a VM 250). The method 1100 may be described with reference to distributed system 100 of FIGS. 1 and 2. At block 1102, the method 1100 includes executing, by data processing hardware 112, a VM 250. Here, the VM 250 includes one or more virtual processors 252 configured to emulate one or more physical processors 112 of hardware resources 110 of the distributed system.

At block 1104, the method 1100 includes attaching, by the data processing hardware 112, a virtual storage device 262 to the VM 250. A logical connection may need to be stablished between the virtual storage device 262 and virtual machine monitor (VMM) 220 hosting the VM 250 so that the virtual storage device 262 can be attached to the VM 250. Here, the virtual storage device 262 exposes a corresponding block storage volume V on memory hardware 114 to the VM 250. The block storage volume V may include a first storage capacity that may be set as a default capacity (e.g., 10 GB). Accordingly, the virtual storage device 262 may provide a storage capacity that maps to the corresponding physical block storage volume V on the memory hardware 114. The memory hardware 114 is in communication with the data processing hardware 112 and may be located on a different hardware resource 110h or the same hardware resource 110 as the data processing hardware 112. The storage capacity on the physical memory hardware 114 can include persistent disks (PD) that store data for a user 120. Persistent disks may be available as standard hard disk drives (HDD) or solid-state drives (SSD). Standard HDD disks may provide benefits of efficiency and reduced costs for handling sequential read/write operations, but are generally not optimized for handling high rates of random input/output operations per second (IOPS). SSD persistent disks are generally better suited for handling high rates of random IOPS. In some examples, the virtual storage device 262 attached to the VM 250 includes a root persistent disk 262r that contains an operating system 212, 212g that executes on the VM 250.

At block 1106, the method 1100 also includes mounting, by the data processing hardware 112, the block storage volume V to the VM 250. In some examples, the data processing hardware 112 receives an identification of the virtual storage device 262 as being a new resource 110 available to the VM 250 from a user computer 130, and the data processing hardware 112 uses the identification of the virtual storage device 262 for attaching the virtual storage device to the VM 250 and mounting the corresponding block storage volume V to the VM 250. The data processing hardware 112 may receive the identification of the virtual storage device 262 through a GUI 139 displayed on a screen of the user computer 130 (e.g., user device)

At block 108 the method 1100 also includes resizing, by the data processing hardware 112, the block storage volume V while the VM 250 continues to execute. The data processing hardware 112 resizes the block storage volume V without attaching an additional virtual storage device to the VM 250 or mounting an additional block storage volume V to the VM 250. The resizing the block storage volume may include increasing the block storage volume V from a first storage capacity (e.g., default storage capacity) to a second storage capacity greater than the first storage capacity. For instance, when the block storage volume V is associated with a root persistent disk, the block storage volume V may be increased from a default capacity (e.g., 10 GB) to a new capacity (e.g., 50 GB) to provide additional space or better performance for operating system data stored on the root persistent disk. The block storage volume V (e.g., persistent disk) is located independently from the VM instance 250, thereby allowing a user 120 to detach or move the block storage volume V to keep the data stored thereon even after deleting the VM instance 250. In some examples, resizing the block storage volume V automatically triggers resizing of a file system to allow the operating system 212, 212g of the VM 250 to access the additional space provided by resizing the block storage volume V. In other examples, the user 120 must resize the file system after resizing the block storage volume V before the operating system 212 will permit access to the additional space afforded by the resized block storage volume V.

In some implementations, the method 1100 further includes, by the data processing hardware, the block storage volume V while continuing execution of the VM 250. Removing the block storage volume V may include unmounting the block storage volume V from the VM 250 and detaching the virtual storage device 262 from the VM and.

Figure 12:
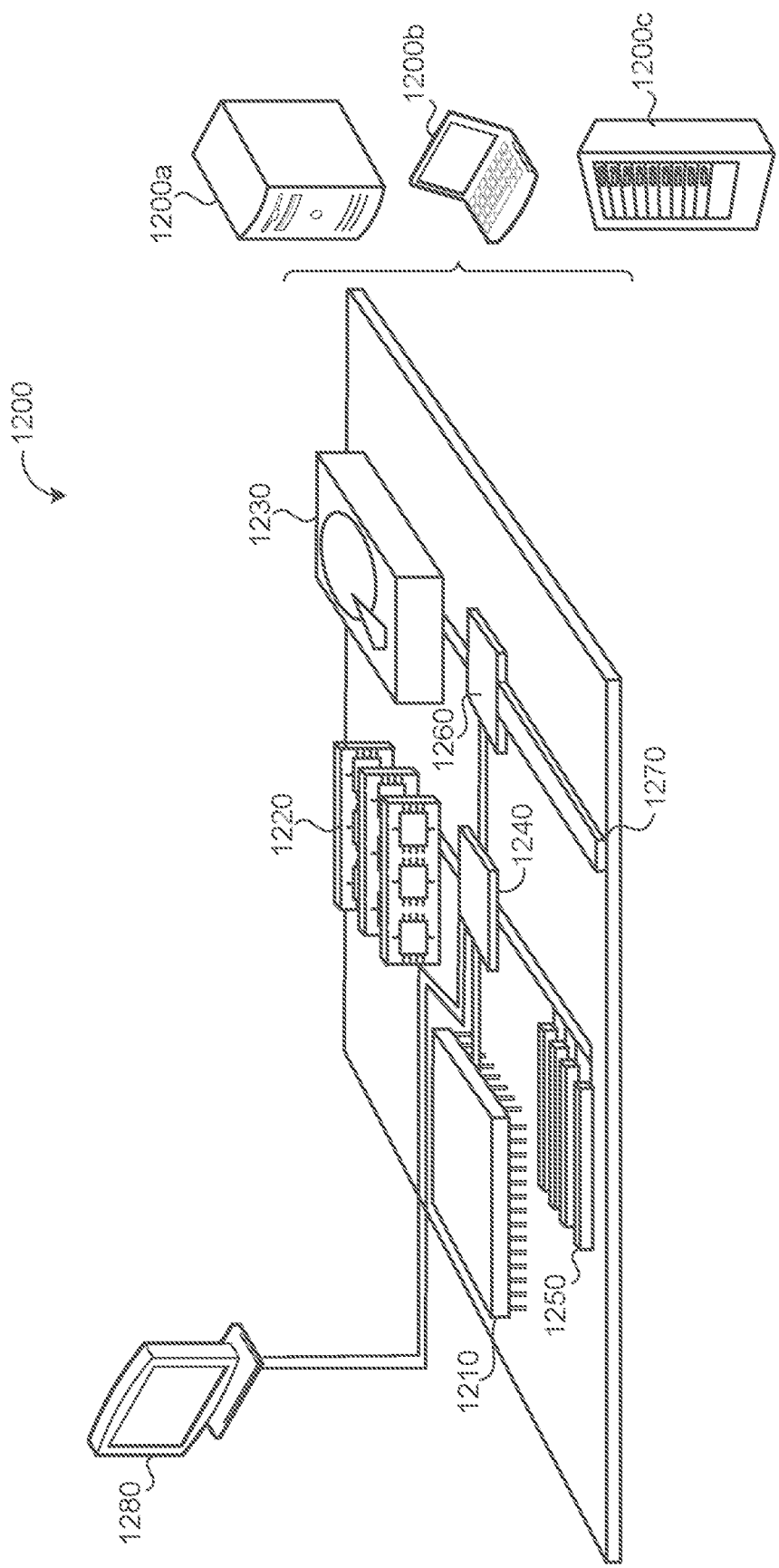
FIG. 12 is a schematic view of an exemplary computing device capable of implementing any systems or methods described herein.

FIG. 12 is schematic view of an example computing device 1200 that may be used to implement the systems and methods described in this document. The computing device 1200 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document The computing device 1200 includes a processor 1210, memory 1220, a storage device 1230, a high-speed interface/controller 1240 connecting to the memory 1220 and high-speed expansion ports 1250, and a low speed interface/controller 1260 connecting to low speed bus 1270 and storage device 1230. Each of the components 1210, 1220, 1230, 1240, 1250, and 1260, are interconnected using various busses, and may be mounted on a common motherboard or in other manners as appropriate. The processor 1210 can process instructions for execution within the computing device 1200, including instructions stored in the memory 1220 or on the storage device 1230 to display graphical information for a graphical user interface (GUI) on an external input/output device, such as display 1280 coupled to high speed interface 1240. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1220 stores information non-transitorily within the computing device 1200. The memory 1220 may be a computer-readable medium, a volatile memory unit(s), or non-volatile memory unit(s). The non-transitory memory 1220 may be physical devices used to store programs (e.g., sequences of instructions) or data (e.g., program state information) on a temporary or permanent basis for use by the computing device 1200. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1230 is capable of providing mass storage for the computing device 1200. In some implementations, the storage device 1230 is a computer-readable medium. In various different implementations, the storage device 1230 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1220, the storage device 1230, or memory on processor 1210.

The high speed controller 1240 manages bandwidth-intensive operations for the computing device 1200, while the low speed controller 1260 manages lower bandwidth-intensive operations. Such allocation of duties is exemplary only. In some implementations, the high-speed controller 1240 is coupled to the memory 1220, the display 1280 (e.g., through a graphics processor or accelerator), and to the high-speed expansion ports 1250, which may accept various expansion cards (not shown). In some implementations, the low-speed controller 1260 is coupled to the storage device 1230 and low-speed expansion port 1270. The low-speed expansion port 1270, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1200a or multiple times in a group of such servers 1200a, as a laptop computer 1200b, or as part of a rack server system 1200c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, a snapshot from a user of a distributed system;
   generating, by the data processing hardware, a virtual machine to establish a virtual environment corresponding to the snapshot, the virtual machine comprising a virtual storage device exposing a corresponding block storage volume on memory hardware to the virtual machine, the block storage volume comprising a default storage capacity, the virtual storage device comprising a root persistent disk containing an operating system that executes on the virtual machine using the block storage volume;
   determining, by the data processing hardware, whether a storage requirement for the virtual machine exceeds the default storage capacity of the block storage volume while the virtual machine executes;
   when the storage requirement for the virtual machine exceeds the default storage capacity, scaling, by the data processing hardware, the block storage volume to contribute additional storage capacity for the operating system; and
   in response to scaling the block storage volume to contribute additional storage capacity for the operating system, resizing, by the data processing hardware, a file system associated with the virtual machine.

2. The method of claim 1, further comprising generating, by the data processing hardware, a directory structure logically mapping the block storage volume to the virtual storage device.

3. The method of claim 1, wherein scaling the block storage volume occurs while the virtual machine continues to execute.

4. The method of claim 1, wherein scaling the block storage volume occurs without attaching an additional virtual storage device to the virtual machine.

5. The method of claim 1, wherein scaling the block storage volume occurs without mounting an additional block storage volume to the virtual machine.

6. The method of claim 1, further comprising:
   attaching, by the data processing hardware, one or more secondary virtual storage devices to the virtual machine, each secondary virtual storage device exposing a corresponding secondary block storage volume on the memory hardware to the virtual machine; and
   mounting, by the data processing hardware, each secondary block storage volume to the virtual machine.

7. The method of claim 6, further comprising
   receiving, at the data processing hardware, an identification of the one or more secondary virtual storage devices as being a new resource available to the virtual machine; and
   using, by the data processing hardware, the identification of the one or more secondary virtual storage devices for attaching the one or more secondary virtual storage devices to the virtual machine and mounting the corresponding block storage volume to the virtual machine.

8. The method of claim 7, further comprising receiving, at the data processing hardware, the identification of the one or more secondary virtual storage devices through a graphical user interface displayed on a screen of a user device in communication with the data processing hardware.

9. The method of claim 1, further comprising attaching, by the data processing hardware, the virtual storage device to the virtual machine by establishing a logical connection between the virtual storage device and a virtual machine monitor hosting the virtual machine.

10. The method of claim 1, further comprising configuring, by the data processing hardware, user access of the block storage volume through the virtual machine.

11. The method of claim 1, further comprising removing, by the data processing hardware, a portion of the block storage volume from the virtual machine while the virtual machine continues to execute.

12. The method of claim 11, wherein removing the portion of the block storage volume comprises:

unmounting the portion of the block storage volume from the virtual machine; and detaching the virtual storage device from the virtual machine.

13. A system comprising:

data processing hardware; and memory hardware in communication with the data processing hardware, the memory hardware storing instructions that when executed on the data processing hardware cause the data processing hardware to perform operations comprising:

receiving a snapshot from a user of a distributed system;

generating a virtual machine to establish a virtual environment corresponding to the snapshot, the virtual machine comprising a virtual storage device exposing a corresponding block storage volume on memory hardware to the virtual machine, the block storage volume comprising a default storage capacity, the virtual storage device comprising a root persistent disk containing an operating system that executes on the virtual machine using the block storage volume;

determining that a storage requirement for the virtual machine exceeds the default storage capacity of the block storage volume while the virtual machine executes;

when the storage requirement for the virtual machine exceeds the default storage capacity, scaling the block storage volume to contribute additional storage capacity for the operating system; and in response to scaling the block storage volume to contribute additional storage capacity for the operating system, resizing a file system associated with the virtual machine.

14. The system of claim 13, wherein the operations further comprise generating a directory structure logically mapping the block storage volume to the virtual storage device.

15. The system of claim 13, wherein scaling the block storage volume occurs while the virtual machine continues to execute.

16. The system of claim 13, wherein scaling the block storage volume occurs without attaching an additional virtual storage device to the virtual machine.

17. The system of claim 13, wherein scaling the block storage volume occurs without mounting an additional block storage volume to the virtual machine.

18. The system of claim 13, wherein the operations further comprise:

attaching one or more secondary virtual storage devices to the virtual machine, each secondary virtual storage device exposing a corresponding secondary block storage volume on the memory hardware to the virtual machine; and mounting each secondary block storage volume to the virtual machine.

19. The system of claim 18, wherein the operations further comprise:

receiving an identification of the one or more secondary virtual storage devices as being a new resource available to the virtual machine; and using the identification of the one or more secondary virtual storage devices for attaching the one or more secondary virtual storage devices to the virtual machine and mounting the corresponding block storage volume to the virtual machine.

20. The system of claim 19, wherein the operations further comprise receiving the identification of the one or more secondary virtual storage devices through a graphical user interface displayed on a screen of a user device in communication with the data processing hardware.

21. The system of claim 13, wherein the operations further comprise attaching the virtual storage device to the virtual machine by establishing a logical connection between the virtual storage device and a virtual machine monitor hosting the virtual machine.

22. The system of claim 13, wherein the operations further comprise configuring user access of the block storage volume through the virtual machine.

23. The system of claim 13, wherein the operations further comprise removing a portion of the block storage volume from the virtual machine while the virtual machine continues to execute.

24. The system of claim 23, wherein removing the portion of the block storage volume comprises:

unmounting the portion of the block storage volume from the virtual machine; and detaching the virtual storage device from the virtual machine.

* * * * *